United States Patent [19]

Mügge et al.

[11] Patent Number: 5,425,817
[45] Date of Patent: Jun. 20, 1995

[54] MULTILAYER PLASTIC PIPE WITH POLYAMIDE INNER AND OUTER LAYERS AND A LINEAR CRYSTALLINE POLYESTER INTERMEDIATE LAYER

[75] Inventors: Joachim Mügge, Haltern; Stefan Röber, Marl, both of Germany

[73] Assignee: Huels Aktiengesellschaft, Marl, Germany

[21] Appl. No.: 974,278

[22] Filed: Nov. 10, 1992

[30] Foreign Application Priority Data

Nov. 14, 1991 [DE] Germany .................. 41 37 430.4

[51] Int. Cl.⁶ .............................................. B32B 33/00
[52] U.S. Cl. ................................... 138/137; 428/35.7; 428/36.9; 428/36.91; 428/474.4; 428/475.2; 138/174
[58] Field of Search ............... 428/474.4, 475.2, 35.7, 428/36.9, 36.91; 138/125, DIG. 7, 137, 126, 174

[56] References Cited

U.S. PATENT DOCUMENTS

| | | | |
|---|---|---|---|
| 3,378,602 | 4/1963 | Robertson | 260/857 |
| 3,561,493 | 2/1971 | Maillard et al. | 138/141 |
| 4,215,176 | 7/1980 | Tuller et al. | 428/412 |
| 4,443,519 | 4/1984 | Donermeyer et al. | 428/336 |
| 4,528,219 | 7/1985 | Yamada et al. | 428/35 |
| 4,656,242 | 4/1987 | Swan et al. | 528/295.3 |
| 4,725,488 | 2/1988 | Swan et al. | 428/248 |
| 4,855,181 | 8/1989 | Shimo et al. | 428/336 |
| 4,948,016 | 8/1990 | Summons et al. | 222/158 |
| 5,108,844 | 4/1992 | Blemberg et al. | 428/518 |

FOREIGN PATENT DOCUMENTS

| | | |
|---|---|---|
| 0325303 | 7/1989 | European Pat. Off. |
| 0509212 | 10/1992 | European Pat. Off. |
| WO87/02680 | 5/1987 | WIPO |

OTHER PUBLICATIONS

Database WPIL, Derwent Publications Ltd., AN 92-320031, JP-A-224 384, Aug. 13, 1992.

*Primary Examiner*—Paul J. Thibodeau
*Assistant Examiner*—David Abraham
*Attorney, Agent, or Firm*—Oblon, Spivak, McClelland, Maier & Neustadt

[57] ABSTRACT

A multilayer plastic pipe having improved barrier action against diffusion of the substance being transported, particularly methanol-containing fuels, dimensional stability, and resistance to mechanical stress, is provided comprising:

an inner layer and an outer layer, each of which comprise a polyamide-based molding composition, wherein the inner layer and outer layer may be the same or different, and at least one intermediate layer comprising a linear, crystalline polyester-based molding composition interposed between and bonding together the inner and outer layers.

11 Claims, No Drawings

MULTILAYER PLASTIC PIPE WITH POLYAMIDE INNER AND OUTER LAYERS AND A LINEAR CRYSTALLINE POLYESTER INTERMEDIATE LAYER

BACKGROUND OF THE INVENTION

1. Field of the Invention:

The present invention relates to a multilayer plastic pipe having improved barrier action against diffusion of the material being transported by the pipe, while maintaining dimensional stability and mechanical strength.

2. Discussion of the Background:

Plastic pipes prepared from polyamide resin are known and are used for various applications. In order to perform the particular application desired, the pipes must be inert to the material flowing in them. Additionally, they must be resistant to both high and low temperatures and mechanical stresses.

Single-layer pipes are not always capable of meeting these necessary requirements. For example, during transportation of aliphatic or aromatic solvents or fuels, they exhibit several problems, such as a lack of barrier action against the medium, dimensional instability and insufficient resistance to mechanical stresses.

Attempts have been made to solve these problems by the use of multilayer pipes (DE-A 35 10 395; 37 15 251; 38 21 723; 38 27 092; 40 01 125; and 40 01 126). However, in practice, while these multilayer pipes can solve these problems individually, the overall set of properties displayed by the pipes is still unsatisfactory.

In particular, one of the primary problems left unsolved by the above-mentioned multilayer pipes is how to adequately reduce the permeation of the pipe by methanol-containing fuels. Due to the constant reduction of legally permitted emission values, the ability to reduce this permeation by methanol fuels is of critical importance.

SUMMARY OF THE INVENTION

Accordingly, one object of the present invention is to provide a polyamide-based pipe which has good barrier action against the material being transported, satisfactory dimensional stability and satisfactory resistance to mechanical stresses.

A further object of the present invention is to provide a polyamide-based pipe which has good barrier action against methanol-containing fuels, while maintaining dimensional stability and resistance to mechanical stress.

These and other objects and attendant advantages have been satisfied by the discovery of a multilayer plastic pipe having an inner layer and an outer layer, both of which comprise a polyamide-based molding composition, where the inner and outer layers are bonded together by at least one intermediate layer comprising a linear, crystalline polyester-based molding composition, wherein the pipe has excellent barrier properties, dimensional stability, and resistance to mechanical stress.

DETAILED DESCRIPTION OF THE PREFERRED EMBODIMENTS

The present invention relates to a multilayer plastic pipe, which has (A) an inner and outer layer, each of which comprises a polyamide-based molding composition, wherein the two layers are bonded to one another by at least one intermediate layer (B) comprising a linear, crystalline polyester-based molding composition.

The inner and outer layers of component A may be made from the same or different polyamides. Each layer may comprise a single polyamide or a mixture of suitable polyamides. Suitable polyamides for use as the layers in component A include aliphatic homo- and copolycondensates. Examples of homopolyamides include 4,6-; 6,6-; 6,12-; 8,10- and 10,10 polyamides. In particular, 6-; 10,12-; 11-; 12- and 12,12-polyamides are preferred. The identification of the polyamides corresponds to the international standard, the first figure(s) indicating the number of C atoms of the starting diamine and the last figure(s) indicating the number of C atoms of the dicarboxylic acid. If only one number is given, this means that an $\alpha,\omega$-amino-carboxylic acid or the lactam derived therefrom has been used as the starting substance (see H Domininghaus, "*Die Kunststoffe und ihre Eigenschaften*" Plastics and their Properties, page 272, VDI-Verlag (1976).

If copolyamides are used, these comprise one or more additional acid components, such as adipic acid, sebacic acid, suberic acid, isophthalic acid or terephthalic acid, and one or more additional diamines, such as bis (4'-aminocyclohexyl)-methane, trimethylhexamethylenediamine, or hexamethylenediamine.

The preparation of these polyamides is known (for example D. B. Jacobs, J. Zimmermann, *Polymerization Processes*, page 424–67; Interscience Publishers, New York (1977) and DE-AS 21 52 194 ).

Mixed aliphatic/aromatic polycondensates such as are described, for example, in U.S. Pat. Nos. 2,071,250; 2,071,251; 2,130,523; 2,130,948; 2,241,322; 2,312,966; and 3,393,210 and in Kirk-Othmer, *Encylopedia of Chemical Technology*, 3rd Edition, Volume 18, page 328 and 435—Wiley & Sons (1982) are also suitable as the polyamides. Additionally, poly(ether-ester-amides) and poly(ether-amides) are polycondensates which are suitable as the polyamides. Such products are described, for example, in DE-OS 27 12 987, 25 23 991 and 30 06 961.

The molecular weight (number-average) of the polyamides is above 5,000, preferably from 10,000 to 100,000, corresponding to a relative viscosity ($\eta$rel) in the range from 1.5 to 2.8.

The linear, crystalline polyester of component B has the following formula (I)

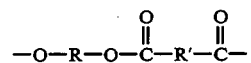

where R represents a divalent, branched or non-branched, aliphatic and/or cycloaliphatic, radical derived from a diol having 2 to 12, preferably 2 to 8, C atoms in the carbon chain and R' represents a divalent aromatic radical having 6 to 20, preferably 8 to 12, C atoms in the carbon skeleton.

Suitable diols include ethylene glycol, trimethylene glycol, tetramethylene glycol, hexamethylene glycol, neopentyl glycol, and cyclohexanedimethanol, with ethylene glycol and tetramethylene glycol being preferred.

Up to 25 mol % of the diol portion of the polyester can be replaced by a second diol selected from the same group of diols as the first, or by a diol having the following formula (II)

wherein R" denotes a divalent radical having 2 to 4 C atoms and x is an integer from 2 to 50.

Suitable aromatic carboxylic acids include terephthalic acid, isophthalic acid, 1,4-, 1,5-, 2,6- or 2,7-naphthalenedicarboxylic acid, diphenic acid and diphenyl ether-4,4'-dicarboxylic acid.

Up to 20 mol % of these aromatic dicarboxylic acids can be replaced by one or more aliphatic dicarboxylic acids, such as, succinic acid, maleic acid, fumaric acid, sebacic acid, and dodecanedioic acid.

Any conventional method may be used to prepare the linear, crystalline polyester of the present invention (see the following for preparative methods: DE-A 24 07 155 and 24 07 156; and *Ullmanns Encyclopadie der technischen Chemie* (Ullmann's Encyclopedia of Industrial Chemistry), 4th Edition, Volume 19, page 65 et seq.—Verlag Chemie GmbH, Weinheim, 1980).

The polyesters employed according to the invention have a viscosity number (J value) in the range from 80 to 240 cm³/g, preferably 130 to 210 cm³/g. If necessary, the polyamides and/or polyesters can be impact modified. Polymers suitable as impact modifiers include ethylene/propylene or ethylene/propylene/diene copolymers (EP-A-295 076), polypentenylene, polyoctenylene, or random copolymers or copolymers having a block-like structure of alkenyl-aromatic compounds with aliphatic olefines or dienes (EP-A-261 748). Additionally, impact-modifying rubbers may be used, such as core/shell rubbers. These have a tough and resilient core of acrylate, methacrylate, butadiene or styrene/butadiene rubber with glass transition temperatures $T_g < 10°$ C., with the core optionally being crosslinked. The shell can be built up from styrene or methyl methacrylate or other unsaturated monomers or combinations thereof (DE-A 21 44 528 and 37 28 685). The content of impact-modifying component should be sufficiently low, preferably less than 50% by weight of the composition, so that the desired barrier properties are not impaired.

Customary auxiliaries and additives, such as flameproofing agents, stabilizers, processing auxiliaries, viscosity modifiers, fillers, and pigments, can be added to component A or component B or both. The amount of auxiliaries and additives, in particular of processing auxiliaries, must be chosen so that the barrier properties are not detrimentally affected.

The multilayer plastic pipes are produced according to conventional methods, such as those described in the references noted above.

The multilayer plastic pipes according to the invention have an excellent chemical resistance to the substance being transported and provide excellent barrier action against diffusion with respect to the substance transported, in particular chemical agents, solvents and fuels. In addition to a three-layer pipe, pipes according to the present invention can comprise, for example, 5 or 7 layers by additionally incorporating further layers of component A or B.

Having generally described this invention, a further understanding can be obtained by reference to certain specific examples which are provided herein for purposes of illustration only and are not intended to be limiting unless otherwise specified.

The results shown in the examples were determined with the aid of the following measurement methods.

The determination of the solution viscosity (relative viscosity $\eta_{rel}$) of the polyamides is carried out using a solution of 0.5% by weight of the polyamide in m-cresol at 25° C. in accordance with DIN 53 727/ISO 307.

The determination of the solution viscosity (viscosity number J) of the polyesters is carried out using a solution of 0.5% by weight of the polyester in an o-dichlorobenzene/phenol mixture (50:50 parts by weight) at 25° C. in accordance with DIN 53 728/ISO 1628—Part 5.

The determination of the diffusion of amounts of fuel is carried out on pipes using a fuel mixture (fuel M15: 42.5 parts by volume of isooctane, 42.5 parts by volume of toluene and 15 parts by volume of methanol) at 23° C. and 50% atmospheric humidity. The 20 mm long samples, are filled with the fuel mixture and connected to a filled storage container during the measurement. Diffusion is determined as the weight loss by diffusion with respect to time (measurement every 24 hours). The weight loss recorded per unit area and measured when the diffusion process is in equilibrium, that is to say when the weight loss determined over 24 hours no longer changes with time, is stated as a measure of the diffusion.

Experiments A–G are comparative experiments which are outside the scope of the present invention.

EXAMPLES

A. Component A.

PA 1: Polyamide 12 ($\eta_{rel}$: 2.08)
PA 2: Polyamide 12 ($\eta_{rel}$: 2.10; modified with 15% by weight of commercially available plasticizer)
PA 3: Polyamide 6 ($\eta_{rel}$: 2.01)
PA 4: Polyamide 11 ($\eta_{rel}$: 2.18; modified with 15% by weight of commercially available plasticizer)
PA 5: Polyamide 12 ($\eta_{rel}$: 2.1; modified with 12 % by weight of commercially available plasticizer)
PA 6: Polyamide 12 ($\eta_{rel}$: 1.90)
PA 7: Polyamide 12 ($\eta_{rel}$: 2.15; modified with 7.5% by weight of commercially available plasticizer)

B. Component B.

Z 1: Polypropylene grafted with maleic anhydride (ADMER ® QF 500 - Mitsui)
Z 2: Ethylene/vinyl alcohol copolymer (EVAL ® EP-E 105 A - KURARAI)
Z 3: Homo-polybutylene terephthalate (J value: 165 cm³/g; VESTODUR ® 3000 - HÜLS AG)

C. Production of the Pipes

The pipes were produced on a laboratory pipe extrusion line with a five-layer pipe die (during production of the three-layer pipes, 2 channels remained closed). The feed extruders all had a screw diameter of 25 mm. The barrel temperatures were 220° C. (PA 2; PA 6; Z 1; Z 2); 230° C. (PA 1; PA 7); 235° C. (PA 5); 240° C. (PA 4); 250° C. (Z 3) and 260° C. (PA 3).

The layer thicknesses of the three-layer pipes are, from the inside outwards: 0.2 mm; 0.2 mm; 0.6 mm. In the case of the five-layer pipe (experiment F), the layer thicknesses are, from the inside outwards: 0.1 mm; 0.05 mm; 0.15 mm; 0.05 mm; 0.65 mm.

In the case of the five-layer pipe (experiment G), the layer thicknesses are, from the inside outwards: 0.45 mm; 0.15 mm; 0.05 mm; 0.05 mm; 0.3 mm.

| Experiment | Inner Layer | Intermediate Layer(s) | Outer Layer | Diffusion [g·d⁻¹·m⁻²] |
|---|---|---|---|---|
| 1 | PA 6 | Z 3 | PA 7 | 1.4 |
| 2 | PA 1 | Z 3 | PA 1 | 1.2 |
| 3 | PA 2 | Z 3 | PA 2 | 1.4 |
| A | PA 1 | PA 1 | PA 1 | 30 |
| B | PA 2 | PA 2 | PA 2 | 100 |
| C | PA 3 | Z 1 | PA 2 | 65 |
| D | PA 3 | Z 2 | PA 2 | 11 |
| E | PA 4 | PA 4 | PA 4 | 60 |
| F | PA 5 | Z 1 Z 2 Z 1 | PA 5 | 3.6 |
| G | PA 3 | Z 2 PA 3 Z 1 | PA 5 | 3.7 |

As can be readily seen, the multilayer pipes according to the present invention (Experiments 1-3) provide diffusion properties which are one to two orders of magnitude better than the 3-layer pipes of the Comparative Examples A-E and approximately 3 times better than the 5-layer pipe of Comparative Examples F and G.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by letters patent of United States is:

1. A multilayer plastic pipe for transporting a chemical agent, solvent or fuel, comprising:
   an inner layer and an outer layer, each of which comprise a polyamide molding composition, wherein said inner layer and said outer layer may be the same or different polyamide-based molding composition; and,
   at least one intermediate layer comprising a linear, crystalline polyester molding composition interposed between and bonding together said inner and outer layers.

2. A multilayer plastic pipe as claimed in claim 1, wherein said inner and outer layers each comprise a polyamide selected from the group consisting of 4,6-; 6-; 6,6-; 6,12-; 8,10-; 10,10-; 10,12-; 12,12-; 11-; and 12- homopolyamide; copolyamides of these homopolyamides with one or more additional acid components selected from the group consisting of adipic acid, sebacic acid, suberic acid, isophthalic acid, and terephthalic acid; copolyamides of these homopolyamides with one or more additional diamines selected from the group consisting of bis(4'-aminocyclohexyl)-methane, trimethyl hexamethylene diamine, or hexamethylene diamine and mixtures thereof.

3. A multilayer plastic pipe according to claim 1, wherein said intermediate layer comprises a linear crystalline polyester of formula (I)

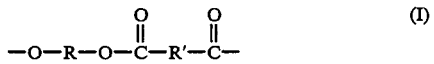

wherein R represents a divalent branched or non-branched, aliphatic or cycloaliphatic radical, derived from a diol having 2 to 12 carbon atoms in the chain, or a mixture thereof, and R' represents a divalent aromatic radical having 6 to 20 carbon atoms in the carbon skeleton.

4. A multilayer plastic pipe according to claim 1, wherein said intermediate layer comprises poly(ethylene terephthalate).

5. A multilayer plastic pipe according to claim 1, wherein said intermediate layer comprises poly(butylene terephthalate).

6. A multilayer plastic pipe according to claim 1, wherein said intermediate layer further comprises one or more additional layers of polyamide molding composition, one or more additional layers of a linear crystalline polyester molding composition, or a combination thereof.

7. A multilayer plastic pipe as claimed in claim 3, wherein up to 25 mol % of said radical R of said polyester is replaced by a second radical selected from the group consisting of a different radical as defined by R, and a radical derived by a diol of formula (II)

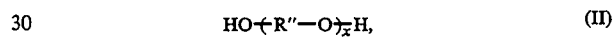

wherein R" represents a divalent radical having from 2 to 4 carbon atoms and x is an integer of from 2 to 50.

8. A multilayer plastic pipe as claimed in claim 3, wherein up to 20 mol % of said aromatic divalent radical R' is replaced by one or more aliphatic divalent radicals derived from a carboxylic acid selected from the group consisting of succinic acid, maleic acid, fumaric acid, sebacic acid and dodecanedioic acid.

9. A multilayer plastic pipe according to claim 3, wherein said linear crystalline polyester has a viscosity number (J value) of from 80 to 240 cm³/g.

10. A multilayer plastic pipe according to claim 1, wherein said polyamide molding composition further comprises one or more substances selected from the group consisting of impact modifiers, processing auxiliaries, flameproofing agents, stabilizers, viscosity modifiers, fillers, and pigments.

11. A multilayer plastic pipe according to claim 1, wherein said linear crystalline polyamide molding composition further comprises one or more substances selected from the group consisting of impact modifiers, processing auxiliaries, flameproofing agents, stabilizers, viscosity modifiers, fillers and pigments.

* * * * *